United States Patent [19]

Sanders

[11] 4,445,811

[45] May 1, 1984

[54] SETTING MECHANISMS ESPECIALLY FOR TOOLS FOR CARRYING OUT ROUTING AND LIKE OPERATIONS

[75] Inventor: Anthony J. Sanders, Newton Aycliffe, England

[73] Assignee: Black & Decker Inc., Newark, Del.

[21] Appl. No.: 322,946

[22] Filed: Nov. 19, 1981

[30] Foreign Application Priority Data

Nov. 24, 1980 [GB] United Kingdom ............... 8037648

[51] Int. Cl.³ ............................................. B23C 1/20
[52] U.S. Cl. .............................. 409/182; 144/134 D;
144/136 C; 408/241 S; 409/184; 409/210;
409/214; 409/218
[58] Field of Search ............... 409/182, 184, 210, 214,
409/218, 220, 178, 181; 408/202, 241 S;
144/134 D, 136 C; 269/215

[56] References Cited

U.S. PATENT DOCUMENTS

| | | | |
|---|---|---|---|
| 1,785,395 | 12/1930 | Shaw et al. | 409/220 |
| 2,664,768 | 1/1954 | Clyne | 408/241 S |
| 2,736,227 | 2/1956 | Stroble | 408/241 S X |
| 2,988,119 | 6/1961 | Godfrey et al. | 144/136 C |
| 3,037,404 | 6/1962 | Burg | 408/241 S |
| 3,689,172 | 9/1972 | Stites | 408/241 S |
| 3,791,260 | 2/1974 | Ambler et al. | 409/182 |

FOREIGN PATENT DOCUMENTS 14902 10/1956 Fed. Rep. of Germany ... 144/134 D

*Primary Examiner*—Z. R. Bilinsky
*Attorney, Agent, or Firm*—Harold Weinstein; Edward D. Murphy; Ronald B. Sherer

[57] ABSTRACT

A tool or machine in which the relative position of two components is adjustable has setting means operable in a first mode to set the two components approximately to a desired setting and in a second mode to adjust the approximate setting accurately to a required setting. A tool for routing has a base plate and a depth stop comprising a post extending upwardly from the base plate, a first collar movable along the post, a screw thread on the outer surface of the first collar, and a second collar whose bore is screw-threaded screwed over the first collar. The post includes a surface in the form of a toothed rack, the first collar has a bore one portion of whose surface is formed to engage one or more teeth on the rack to lock the first collar in a selected one of a number of predetermined positions along the post and a spring resiliently biases the first collar into engagement with the toothed rack. A scale operating with a fiducial mark is provided.

5 Claims, 9 Drawing Figures

SETTING MECHANISMS ESPECIALLY FOR TOOLS FOR CARRYING OUT ROUTING AND LIKE OPERATIONS

FIELD OF THE INVENTION

This invention relates to tools or machines where the relative position of two components is required to be set quickly and accurately, and in particular, but not exclusively, to tools for carrying out routing and like operations, for example, grooving, rebating and slotting.

BACKGROUND OF THE INVENTION

Such tools may comprise a base plate of generally annular form from which pillars extend. On the pillars is mounted a structure movable towards and away from the base plate. The structure includes a driving motor, usually an electric motor, on whose output shaft is mounted a collet for receiving a tool bit of a configuration appropriate to the task to be performed. On moving the structure towards the base plate, the tool bit moves through the central aperture in the base plate and into engagement with the work piece.

The tool is fitted with a depth gauge that is set by a user and determines the extent of the downward movement of the structure. The extent of the downward movement of the structure determines the extent of movement of the bit and it is clearly important that the user be able to set the gauge accurately, easily and quickly.

SUMMARY OF THE INVENTION

It is an object of the invention to provide a tool or machine in which the relative position of two components can be set quickly and accurately. A particular object of the invention is to provide a tool for carrying out routing and like operations including a depth stop which can be set quickly and accurately to a required setting.

According to one aspect of the invention there is provided a tool or machine in which the relative position of two components is adjustable, the tool or machine including means for setting the relative position of the two components, the setting means being operable in a first mode to set the two components approximately to a desired setting and being operable in a second mode to adjust the approximate setting accurately to a required setting.

According to another aspect of the invention there is provided a tool for carrying out routing and like operations, the tool including a depth stop having means for setting the stop, the setting means being operable in a first mode to set the two components approximately to a desired setting and being operable in a second mode to adjust the approximate setting accurately to a required setting.

In one embodiment of the invention, the tool includes a base plate and a depth stop comprising a post extending upwardly from the base plate, a support member movable along the post, means for releaseably locking the support member in a selected one of a number of predetermined positions along the post, and a location member so mounted upon the support member as to be capable of movement relatively thereto in a direction along the length of the post.

Preferably the post includes a surface, for example a surface in the form of a toothed rack, and the support member being resiliently biassed into engagement with the surface for retaining the support member in one of the predetermined positions. Where the surface is in the form of a toothed rack, the support member may be in the form of a collar having a bore one portion of whose surface is formed to engage one or more teeth on the rack to lock the collar in one of the predetermined positions. In this embodiment, the collar may be of generally cylindrical form, the curved surface of the collar being screw-threaded. A second collar whose bore is screw-threaded is screwed over the first mentioned collar.

A scale which operates with a fiducial mark may be provided enabling a user to set the depth stop to a required position. Preferably, the scale is mounted so as to move vertically with the first-mentioned collar yet not to rotate with it.

BRIEF DESCRIPTION OF THE DRAWINGS

By way of example only, certain illustrative embodiments of the invention will now be described in greater detail with reference to the accompanying drawings of which.

DETAILED DESCRIPTION OF THE PREFERRED EMBODIMENTS

Figure 1:
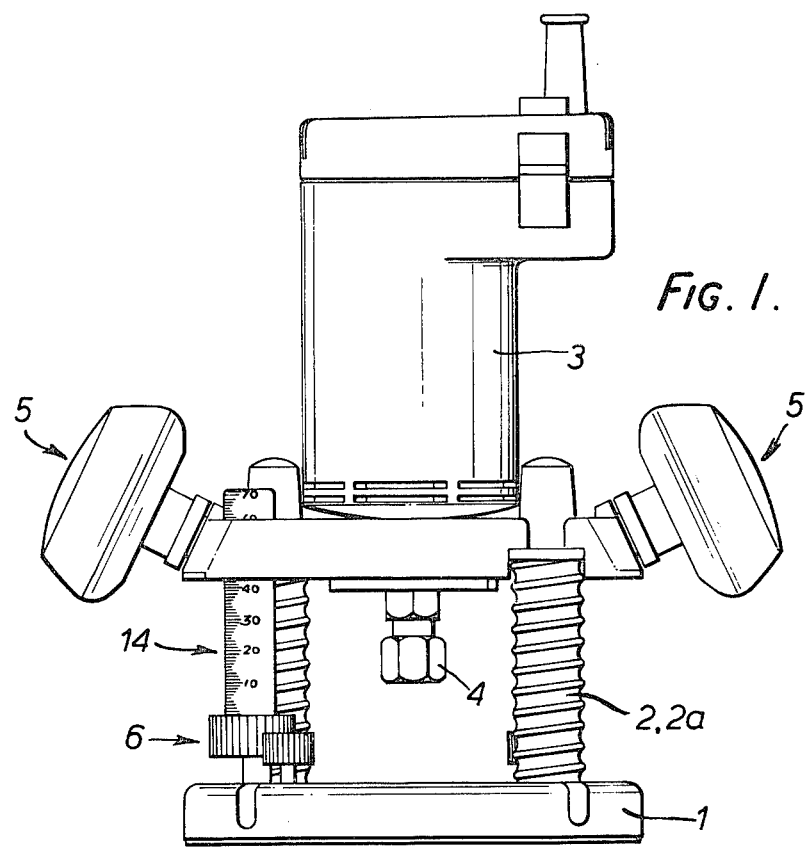
FIG. 1 is a perspective view of a first embodiment of the invention.

Referring first to FIG. 1, the tool shown is of the "plunge" type having a base plate 1 of generally annular form. From the base, pillars 2 extend upwardly and carry a housing 3 containing an electric drive motor, controls and safety switches therefor. On the output shaft of the motor is a collet 4 for receiving a tool bit. Extending sideways from the housing 3 are handles 5 by means of which a user manipulates the tool.

The tool is used in conventional manner, the user first locates it in position and then by pressing down on the handles 5 moves the housing 3 towards the base plate 1 and in so doing brings a bit in the chuck into engagement with a work piece (not shown). Springs 2a round the pillars 2 return the housing to its original position when the pressure is released.

The extent of the movement of the housing 3 towards the base plate 1 is preset by the user by means of a depth stop 16 and scale 14 fitted between the base plate and the housing. The depth stop will now be described with reference to FIGS. 2 and 3.

Figure 2:
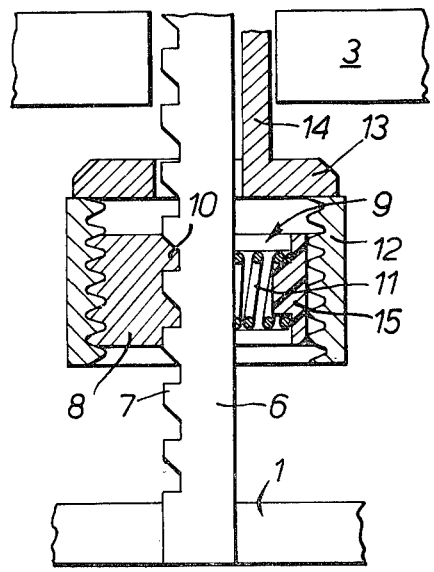
FIG. 2 is a vertical section of a detail of the embodiment of FIG. 1.

FIG. 2 is a vertical section of the depth stop. Extending upwardly from the base plate 1 is a column 6 of rectangular transverse cross-section. One face of the column is formed as a rack with teeth 7 contoured as shown. The column 6 extends upwardly into a suitable recess in the housing 3.

Movable along the length of the column 6 is a support member in the form of a collar 8 with a bore 9 of rectangular shape but whose dimensions are larger than those of the rack portion of the column by an extent sufficient to allow teeth 10 formed on a portion of the bore 9 to be engaged with and disengaged from the teeth 7. Disengagement is effected by moving the collar 8 to the left as seen in FIG. 2 against the action of a spring 11 acting between a face of the column and a plastics pad 15 which is pressed against a part of the bore 9.

The collar 8 is of generally cylindrical shape, the curved outer surface being screw-threaded to receive a second collar 12 whose axial depth exceeds that of the collar 8.

Resting upon the upper (as seen in FIG. 2) end of the collar 12 is the base 13 of the scale 14 that extends upwardly adjacent the column 6 from the base 13. The scale 14 carries markings indicating the extent by which the housing 3 can be moved towards the plate 1 before the upper surface of the base 13 comes into contact with the housing 3 and stops the movement.

Adjustment of the depth stop is thus a two stage operation. First, the user sets the stop to approximately the correct position using the "coarse" adjustment provided by the toothed rack. Second, by using the "fine" adjustment provided by the second collar 12 an accurate positioning of the stop is obtained.

The user first shifts collar 8 to the left as seen in FIG. 2 to disengage the teeth 10 on the collar to be disengaged from the teeth 7 of the rack and then, with the teeth held disengaged, the assembly comprising the collars 8 and 12 is slid along the pillar to the position nearest to the required position that the pitch of the teeth will allow. Then, by rotating the collar 12 relatively to the collar 8, the former can be brought accurately into the required position.

The depth is now set and the tool ready for use.

The pad 15 acts to prevent vibration from the motor rotating the collar 12 away from the set position.

Figure 3:
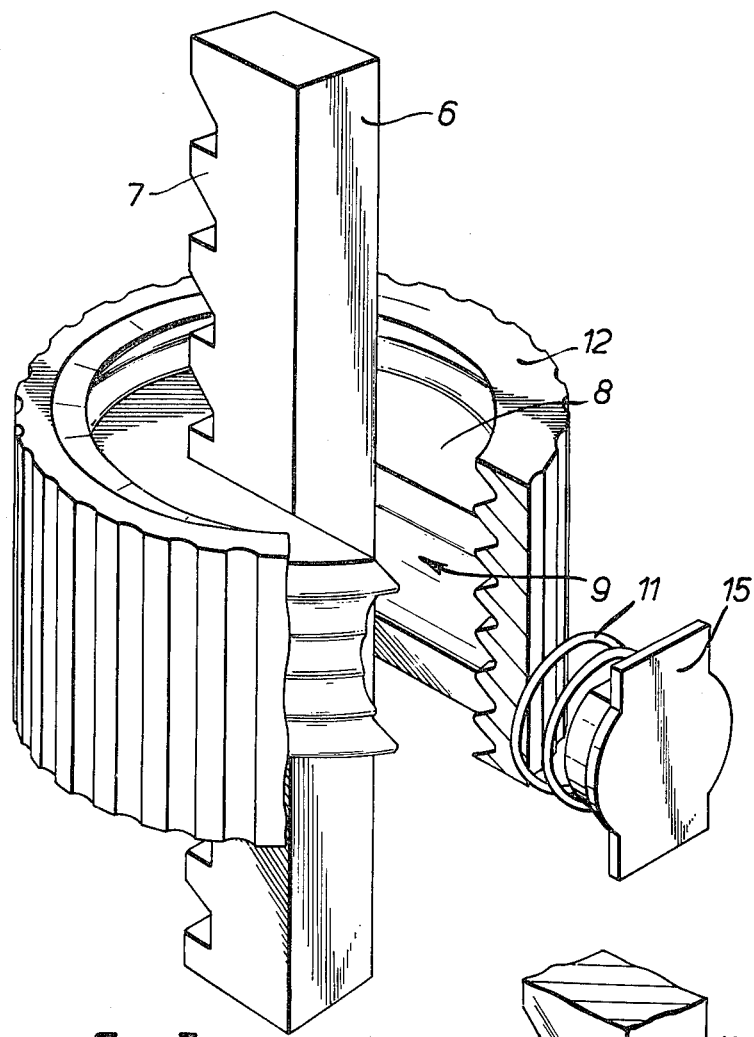
FIG. 3 is a perspective partly exploded view of the components of the detail of FIG. 2.
Figure 4:
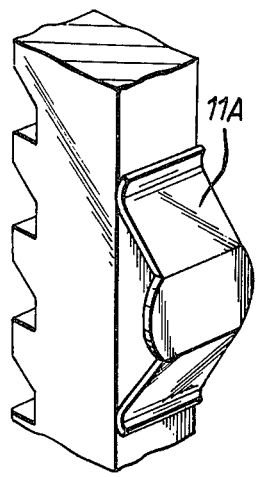
FIG. 4 is a perspective view showing a modification according to the invention to the embodiment of FIGS. 2 and 3.

FIG. 4 shows an alternative spring 11A which may be used in place of the spring 11 and pad 15 shown in FIGS. 2 and 3.

Figure 5:
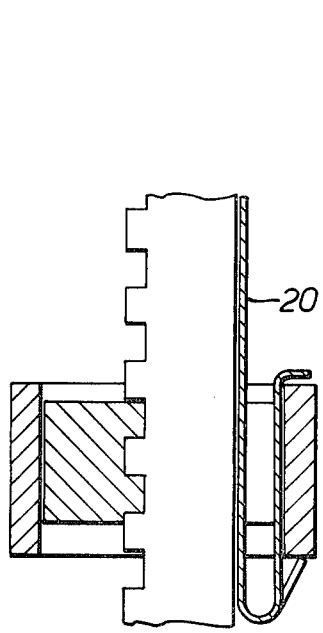
FIG. 5 is a vertical section showing another modification according to the invention to the embodiment of FIGS. 2 and 3.

In the embodiment shown in FIGS. 2 and 3, the scale rests on the top of the collar 12. Alternative arrangements would be to fix the scale to the collar 8 or to mount the scale in the collar 12 so that it moves vertically with the collar but does not rotate with it. An embodiment incorporating the latter arrangement is shown in FIG. 5. A single leaf spring 20 incorporating a scale is used in place of the spring 11, pad 15 and scale 14 shown in FIGS. 2 and 3. Further alternative arrangements would be to provide the scale in the form of a drum and fix the drum to the collar 12 or to omit the scale altogether.

Figure 5A:
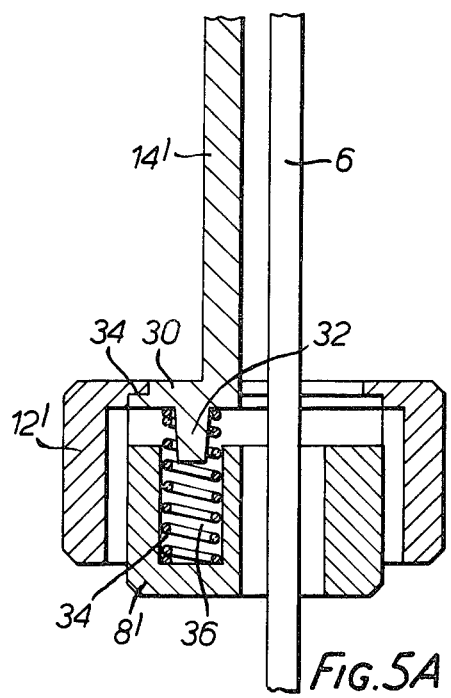
FIG. 5A is a vertical section taken at right angles to the section of FIG. 5 and showing another modification according to the invention to the embodiment of FIGS. 2 and 3.

Another arrangement in which the scale is mounted in the outer collar so that it moves vertically with the collar but does not rotate with it is shown in FIG. 5A. In the arrangement shown in FIG. 5A, a scale 14' is provided with a flanged pedestal 30, semi-circular in plan, from which a lug 32 depends. A collar 12' is provided corresponding to the collar 12 described above but having an inwardly projecting circumferential flange 34 at its upper end to mate with the flanged periphery of the pedestal 30. A collar 8' is provided corresponding to the collar 8 described above but having a bore 34 therein in axial alignment with the lug 32. A helical compression spring 36, tapered at its upper end, is located in the bore 34 and about the lug 32. The action of the spring 36 is to retain the scale 14' from rotation with the outer collar 12' but to resiliently bias the pedestal against the flange 34 so that the scale moves vertically with the collar.

Figure 6:
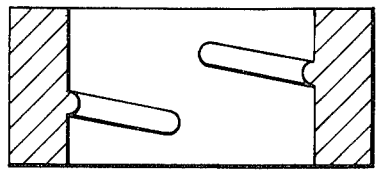
FIG. 6 is a vertical section of one member which may be incorporated in the embodiments various of the invention.
Figure 7:
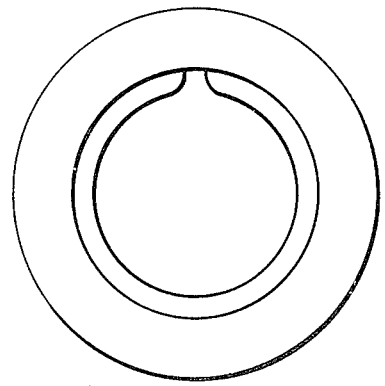
FIG. 7 is a plan view of the member of FIG. 6.

The collar 12, instead of having a multi-turn thread as shown in FIG. 2 may have just a single turn as shown in FIGS. 6 and 7 as this facilitates production of the collar.

Figure 8:
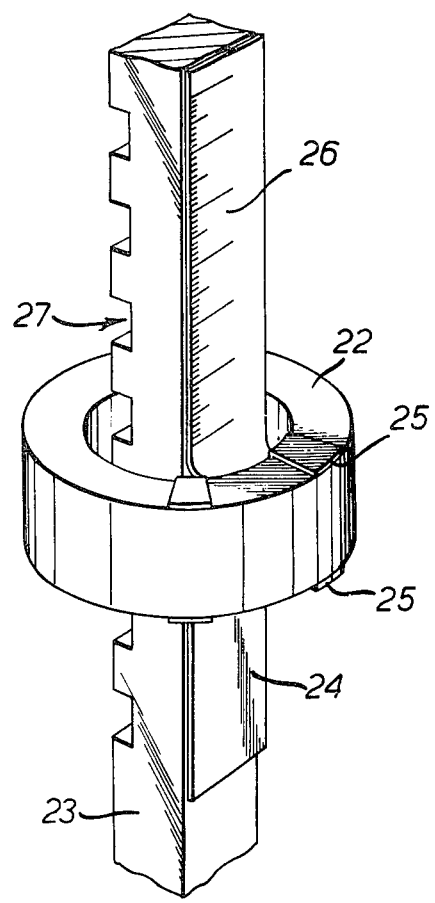
FIG. 8 is a perspective view showing another embodiment of the invention.

Another embodiment of the invention is illustrated in FIG. 8. In this embodiment a single collar 22 is provided. A column 23 corresponds to the column 6 of FIG. 2 but the rack 27 formed on the column may have a curved outer surface matching the bore of the collar 22 which has a deep screw thread and the teeth of the rack may be inclined to match the pitch of the screw threaded bore. A leaf spring 24, which is held in fixed axial relationship with the collar 22 by tongues 25 and has a scale 26 marked thereon is stressed between the adjacent surfaces of the collar and the rack and biases the collar 22 into threaded engagement with the rack.

In order to set the depth stop of FIG. 2 the user presses the collar 22 against the bias of the spring 24 and slides the collar along the rack to approximately the correct position. Then, by rotating the collar 22, but not the scale 26, an accurate positioning of the stop is obtained.

While the stop mechanism has been described in relation to a router, it will be appreciated that the mechanism could be used on many other tools, for example a drill stand, for height adjustment of a lawn mower/rake/brush, for positioning a rip fence on a band saw, bench saw, circular saw, as a depth stop on a circular saw or as a spreading control for a fertiliser spreader.

I claim:

1. A tool for carrying out routing and like operations, comprising:
    a base plate;
    a depth stop extending upwardly from the base plate, and comprising a post including a surface in the form of a toothed rack;
    a first collar of generally cylindrical form movable along said post and having a bore, one portion of the surface of said bore being formed to engage one or more teeth on said rack to lock said first collar in a selected one of a number of predetermined positions along said post;
    means for resiliently biasing said one surface portion of said first collar into engagement with said toothed rack;
    a screw thread on the outer surface of said first collar;
    a second collar having a screw-threaded bore screwed over said first collar; and
    a scale connected to said second collar for movement therewith along said post, said scale having a portion disposed between said post and said second collar, and said portion comprising said resiliently biasing means;
    whereby said first collar is operable to set said depth stop approximately to a desired setting and said second collar is operable to adjust the approximate setting of said depth stop accurately to a required setting.

2. The tool of claim 1, wherein said scale comprises a leaf spring and extends upwardly from said second collar.

3. The tool of claim 1, wherein said second collar has an axial depth greater than that of said first collar.

4. A tool for carrying out routing and like operations on a workpiece, comprising:
- a base plate;
- a housing having means for driving a tool bit, said housing being connected to said base plate and being movable towards and away from said base plate for moving the tool bit into and out of engagement with the workpiece;
- a depth stop for adjustably limiting the downward movement of said housing relative to said base plate;
- said depth stop comprising a post extending upwardly from said base plate, a first collar of generally cylindrical form mounted on and movable along said post, and a second collar encircling and screw-threaded onto said first collar, the position of said second collar relative to said post limiting the downward movement of said housing relative to said base plate;
- said post having a rectangular cross-section with a toothed rack formed along one side of said post;
- said first collar having a rectangular bore through which said post is slidably and non-rotatably located, said bore having at least one internal tooth on one side thereof for engaging said toothed rack, and said bore having a larger dimension in the direction at right angles to said internally toothed side than the cross-section of said post in said direction to enable said first collar to be displaced in said direction relative to said post for disengaging said internal tooth from said toothed rack and enabling said first collar to be slid along said post;
- means for resiliently urging said internal tooth into engagement with said toothed rack;
- said first collar being slid along said post to set said depth stop approximately to a desired setting, and said second collar being rotated relative to said first collar to adjust the approximate setting accurately to the desired setting; and
- a scale connected to said second collar for movement therewith along said post, said scale having a portion disposed between said post and said second collar, and said portion comprising said resilient means.

5. The tool of claim 4, wherein said scale extends parallel to said post and upwardly from said second collar.

* * * * *